Nov. 1, 1966         D. S. PERRY         3,283,186
PLUG TYPE MOTOR BINDING POST
Filed Oct. 30, 1963         2 Sheets-Sheet 1
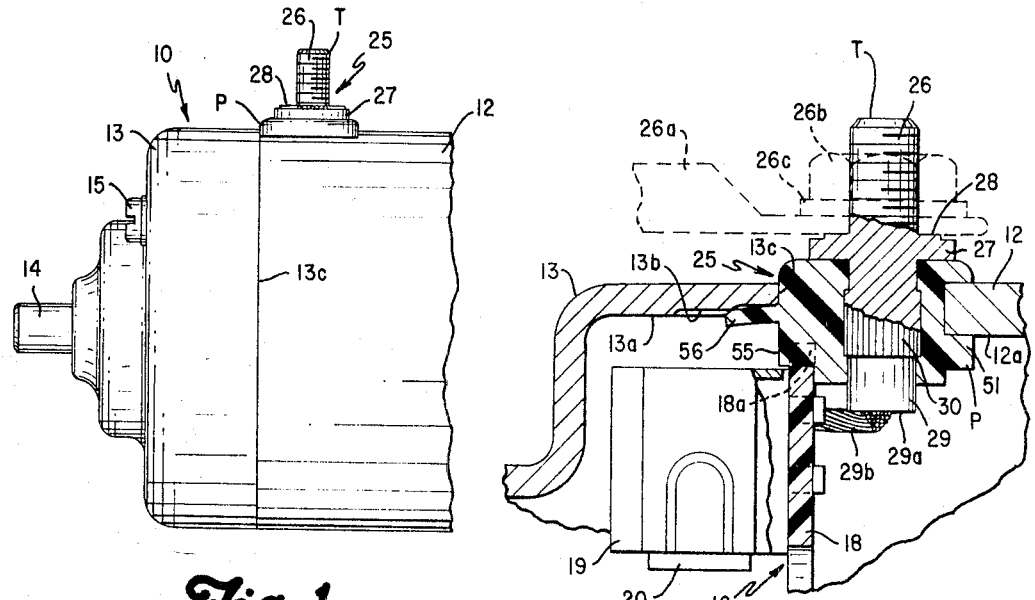
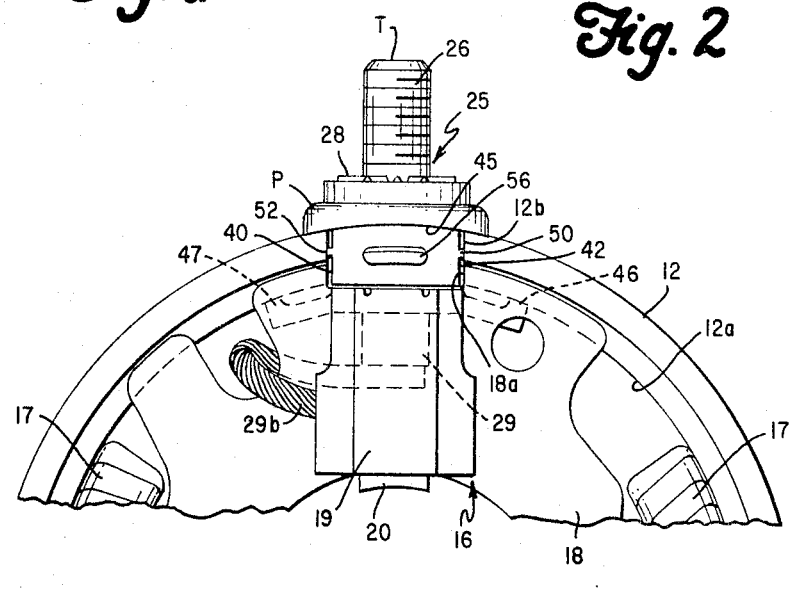
INVENTOR.
DONALD S. PERRY
BY
Souther & Stoltenberg
ATTORNEYS

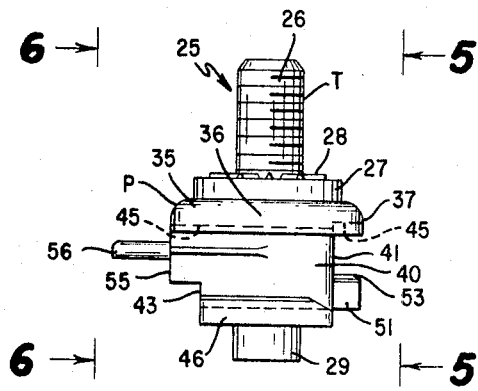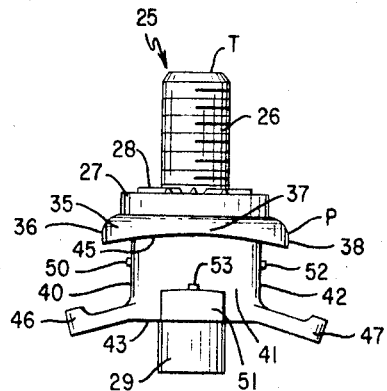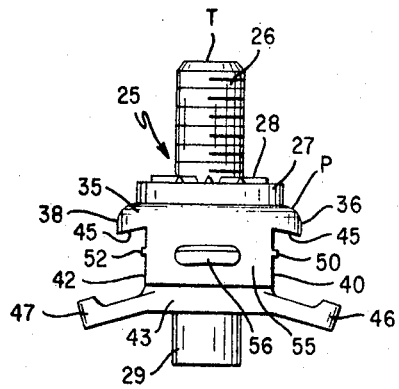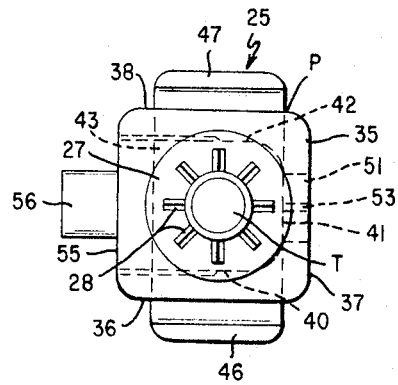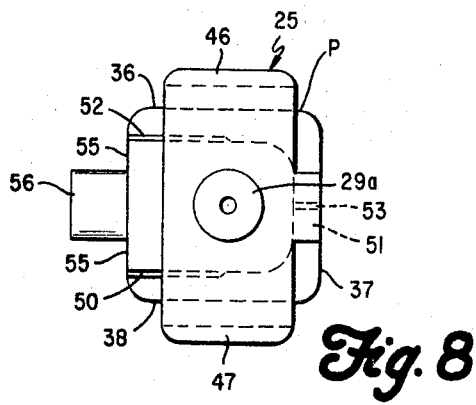

United States Patent Office 3,283,186
Patented Nov. 1, 1966

3,283,186
PLUG TYPE MOTOR BINDING POST
Donald S. Perry, Syracuse, N.Y., assignor to Eltra Corporation, Toledo, Ohio, a corporation of New York
Filed Oct. 30, 1963, Ser. No. 320,090
5 Claims. (Cl. 310—71)

This invention relates to dynamo-electric machines, and more particularly to a prefabricated terminal assembly comprising a metal terminal member positioned and affixed in a molded insulating member which is assembled with the dynamo electric machine to fulfill several desirable functions to facilitate assembly of the dynamo electric machines on a mass production line.

The invention contemplates the provision of a terminal member which can be mounted in a dynamo-electric machine housing without using lock washers, nuts, etc. The member is prefabricated by embedding the terminal stud in a semi-rigid insulating body having external flanges which cooperate with the housing of the dynamo-electric machine to maintain the terminal assembly securely within a rectangular aperture provided in the housing. The terminal assembly is provided with projecting connecting conductor members extending from the opposite sides of the insulating body (both inside and outside of the dynamo electric machine) for purpose of making electrical connections thereto.

Heretofore, terminal connections projecting from dynamo electric machine housings have resembled a "sandwich" type of construction in that they comprised a plurality of metal and insulating washers maintained in assembled relation on a stud member with threaded nuts. This type of construction has the disadvantage that it is tedious and time consuming to assemble resulting in construction which is too expensive for mass production manufacturing. Other disadvantages of previous terminal constructions were "creeping" changes in the dimensions of the insulating members when under compression by the locking nuts, and fractured studs resulting from excessive torque on the lock nuts.

It is, therefore, a principal object of this invention to provide an improved insulated terminal assembly which can be prefabricated and mounted to an annular wall of a dynamo electric machine to provide an external terminal connection.

Another object of the invention is to provide a prefabricated terminal assembly comprising a threaded terminal stud centrally affixed in a molded insulating member the molded insulating member having cooperating, spaced external flanges which will provide the sole means to mount the terminal assembly firmly in a slot in the annular wall of a dynamo electric machine housing.

Another object of the invention is to provide an external terminal for a dynamo electric machine which is affixed in an insulating member which is provided with integral flanges for mounting the terminal member in such a fashion as to permit the connecting of an electrical conductor externally to the dynamo electric machine without developing destructive stresses within the insulating member.

It is still another object of the invention to provide an improved external terminal construction for a dynamo electric machine that will eliminate sub-assemblies consisting of many loose members to facilitate the assembling of the terminal and related elements in a mass production line to thereby reduce the manufacturing costs.

Other objects and advantages of this invention relating to the arrangement, operation and function of the related elements of the structure, to various details of construction, to combinations of parts and to economies of manufacture will be apparent to those skilled in the art upon consideration of the following description and appended claims, reference being had to the accompanying drawings forming a part of this specification wherein like reference characters designate corresponding parts in the several views.

Referring to the drawings:

FIG. 1 is a side elevation of a portion of a dynamo electric machine which is provided with an insulated terminal incorporating the invention;

FIG. 2 is an enlarged sectional elevation taken on a radial plane projecting from the longitudinal axis of the dynamo electric machine through the terminal showing the construction of the insulated terminal assembly and related parts;

FIG. 3 is an enlarged partial elevation of one end of the dynamo electric machine with the end cover member removed;

FIG. 4 is an enlarged side elevation of the terminal assembly;

FIG. 5 is an end elevation taken on line 5—5 of FIG. 4;

FIG. 6 is an end elevation taken on line 6—6 of FIG. 4;

FIG. 7 is a top plan view of FIG. 4; and FIG. 8 is a bottom plan view of FIG. 4.

In the drawings, particularly FIGS. 1, 2, and 3, a portion of a dynamo electric machine 10, such as an electric motor for a windshield wiper, is shown which is conventional in construction in that it comprises a tubular housing 12, an end head 13, a rotatable drive shaft 14 for the armature (not shown), and a through bolt 15 (only one of which is shown) to hold the members in assembled relation. Enclosed within the housing is a brush holder assembly 16 and field coils 17, only portions of which are shown. The brush holder assembly 16 includes a transverse brush holder card 18 of insulating material on which is mounted a brush holder member 19 which maintains a carbon brush 20 in radial contact with an armature commutator (not shown). The members described thus far form no part of this invention, but have a direct relationship with a prefabricated terminal assembly 25, incorporating the invention, which will be better understood hereinafter.

The terminal assembly is provided for the dynamo electric machine to connect a source of electric power to the device through suitable external and internal conductors (26a, 29b) which are adapted to connect to opposite ends of the central metallic terminal member T, the prefabricated assembly (FIGS. 2 through 8) consisting of only two members, the metallic terminal member T, and a molded plastic insulating body P which supports it.

Referring particularly to FIG. 2, the terminal T is fabricated as a sub-assembly which comprises the central metal member T consisting of a metallic threaded portion 26 which provides a means of connecting an external cable 26a to the terminal, a serrated central portion 30 affixed in the insulating body P and a lower portion 29 to which the inner wire connections are attached. An annular flange or collar 27 is formed at the base of the terminal threaded portion 26 which has a plurality of integral projecting serrations 28 (FIGS. 2 through 7) formed on its upper face. The collar 27 provides an abutment to absorb the stress from tightening the nut 26b, thus preventing extraction of the terminal member T from the insulating member P. The compressive force developed between the collar 27 and the nut 26b causes the serrations 28 to bite into the lower surface of the cable terminal 26a, to improve the electrical connection at the terminal and also resist rotation of the cable through vibrations or the like.

The bottom or inboard end of the downwardly projecting pin 29 is formed with a flat surface 29a which provides a means of connecting an internal conductor 29b to the terminal, such as by welding or the like. The opposite end of the conductor 29b is connected in a conventional manner to the carbon brush 20.

The terminal member T is (FIG. 2) embedded in the insulating body P, providing electrical insulation between the terminal and the dynamo electric machine housing. The insulating body P is a semi-rigid member formed of a suitable plastic-like material, such as a commercially available material known by the trademark "Fiberfil" which consists of a glass fiber filled nylon. Many insulation formulations could be used having similar characteristics.

The member P is preferably formed by molding to position the insulating material to completely surround the serrated mid-section 30 of the metal terminal member T with the threaded upper portion 26 above the flange 27 projecting upwardly and the pin 29 projecting downwardly as shown for purposes already described. This provides a unitary construction which will resist rotation or extraction of the terminal member when a cable is connected to the threaded end of the terminal.

The insulating member P which is essentially cubical in shape is provided with integral tongues, ridges and flanges formed on the exterior thereof which have specific functions to facilitate and maintain the insulated terminal in assembled position in the open slot 12b of the dynamo electric machine frame. At the upper end of the member P just below the metal flange or collar 27, the main body is provided with an outwardly extending flange on three sides to overlie the outside of the frame 12 of the machine to form a weather seal. The flange has three projecting portions 36, 37, and 38, from three sides 40, 41, and 42, respectively, of a substantially cubically-shaped body portion 43 of the insulating member. A concave surface 45 is formed on the bottom surface of the projections 36, 37, and 38, which has a radius substantially the same as the outside surface of the frame 12 of a dynamo electric machine with which the insulator is to be used. This provides a snug fit with the housing member and tends to resist the entrance of moisture through the rectangular opening 12b provided in the housing.

At the bottom of the cubical body 43 two wing-like flange portions 46 and 47 are provided which project laterally and slightly downwardly from the sides 40 and 42, respectively. These two extensions are adapted to flex to contact the inside surface 12a of the housing 12 (FIG. 3) to provide a resilient retaining force against the concave surfaces 40 of the upper flange. The slight flex of the flanges will accommodate the variations in metal thickness when inserting the insulator into the rectangular notch 12b provided in the edge of the housing 12. This permits assembly of parts having liberal manufacturing tolerance.

The two opposite sides 40 and 42 of the main cubical body are provided with ribs 50 and 52, respectively, capable of being deformed or sheared which also accommodate to manufacturing tolerances to insure a tight fit of the assembled members and resists side shifting and rotation of the insulator body in the notch 12b. Side 41 of the insulator has a projection 51 which contacts the inside surface 12a of the housing 12 and is provided with a shearable rib 53 on its upper side to assure a good fit on insertion of the assembly into the notch 12b. Projection 51, therefore, provides rigid resistance to rocking of the terminal assembly P in the longitudinal axis of the housing.

Projecting from the fourth or front side 55 of the insulator body is an integral projection 56. By pressing against the inside surface 13a of the end head 13 (FIG. 2), this projection gives resilient resistance to rocking of the terminal assembly P in the longitudinal axis of the housing. An indentation 13b in the end head is provided to cooperate with the projection 56 so that the projection can also serve as an indexing means for assembling the end head on the housing 12. Side 55 above the projection 56 provides a bearing surface for the front edge 13c of the end head to hold and lock the complete terminal assembly in position in the notch 12b of the housing. The insulating member P also cooperates with the transverse brush card 18 with its lower body portion to provide an indexing means therefor (FIGS. 2 and 3). A notch 18a is provided in the brush card which cooperates with portions of the sides 40 and 42 adjacent the side 55 and serves as the indexing means. The insulating body has been designed to resist rotation or extraction of the body P, with relation to the dynamo electric machine housing, when external forces are applied to the terminal member T.

It is to be understood that the above detailed description of the present invention is intended to disclose an embodiment thereof to those skilled in the art, but that the invention is not to be construed as limited in its application to the details of construction and arrangement of parts illustrated in the accompanying drawings since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed is:

1. In an outwardly-projecting terminal for a dynamo-electric machine having a tubular housing divided transversely into two cooperating sections in end to end relation, a slot in edge of at least one of the sections adapted to be closed by the other section when the housing sections are in cooperative relation, a block of resilient insulating material having cooperating pairs of flanges on at least two sides adapted to fit into the open end of the slot in one of the sections with the flanges embracing the edges of the slot, the inner flanges of said pairs of cooperating flanges being wing-like in shape extending a substantial distance in a lateral direction to contact the inner surface of the housing to be deflected thereby to resiliently urge the block in an inward direction, the block being held in fixed position in the slot by the other housing section, and terminal means for making electrical connection to the electrical circuit of the dynamo-electric machine affixed into the block of insulating material in transverse relation to extend the terminal means inwardly and outwardly of the wall of the tubular housing.

2. In an outwardly-projecting terminal for a dynamo-electric machine having a tubular housing divided transversely into two cooperating sections in end to end relation, a rectangular slot in edge of at least one of the sections adapted to be closed by the other section when the housing sections are in cooperative relation, a rectangular block of resilient insulating material having cooperating pairs of flanges on at least two sides adapted to fit into the open end of the slot in one of the sections with the flanges embracing the edges of the slot, the inner flanges of said pairs of cooperating flanges being wing-like in form and adapted to be deflected when the block is in position in the slot by contacting the inner surface of the housing to resiliently urge the block inwardly thereof, the block being held in fixed position in the slot by the other housing section, terminal means for making electrical connection to the electrical circuit of the dynamo-electric machine affixed into the block of insulating material in transverse relation to extend the terminal means inwardly and outwardly of the wall of the tubular housing, and means to hold the cooperative housing sections permanently in end to end relation.

3. In an outwardly-projecting terminal for a dynamo-electric machine having a tubular housing divided transversely into two cooperating sections in end to end relation, a rectangular slot in edge of at least one of the sections adapted to be closed by the other section when the housing sections are in cooperative relation, a rectangular block of resilient insulating material having cooperating pairs of flanges on at least two sides adapted to fit into the open end of the slot in one of the sections with the flanges embracing the edges of the slot, the inner flanges of said pairs of cooperating flanges extending laterally a substantial distance from the block and formed in a manner to be deflected when the block is in position in the slot to resiliently urge the block in an inward direction, the block being held in fixed position in the slot by the other housing section cooperating with the exposed side of the block in the slot, terminal means for making electrical connection to the electrical circuit of the dynamo-electric machine affixed into the block of insulating material in transverse relation to extend the terminal means inwardly and outwardly of the wall of the tubular housing, and means to hold the housing sections in cooperative end to end relation.

4. In an outwardly-projecting terminal for a dynamo-electric machine having a tubular housing divided transversely into two cooperating sections in end to end relation, a rectangular slot in edge of at least one of the sections adapted to be closed by the other section when the housing sections are in cooperative relation, a rectangular block of resilient insulating material having cooperating pairs of flanges on at least two sides adapted to tightly fit into the open end of the slot in one of the sections with the flanges embracing the edges of the slot, the block being held in fixed position in the slot by the other housing section, a tongue on the exposed side of the block to cooperate with the other housing section to index the same, and terminal means for making electrical connection to the electrical circuit of the dynamo-electric machine affixed into the block of insulating material in transverse relation to extend the terminal means inwardly and outwardly of the wall of the tubular housing.

5. In an outwardly-projecting terminal for a dynamo-electric machine having a tubular housing divided transversely into two cooperating sections in end to end relation, including a transverse brush holder card held in position between the sections, a rectangular slot in edge of one of the sections adapted to be closed by the other section when the housing sections are in cooperative relation, a rectangular block of resilient insulating material having cooperating pairs of flanges on at least two sides adapted to fit into the open end of the slot in one of the sections with the flanges embracing the edges of the slot, the block being held in fixed position in the slot by the other housing section, said block cooperating with the brush holder card for indexing it in a predetermined relation with the housing sections, and terminal means for making electrical connection to the electrical circuit of the dynamo-electric machine molded into the block of insulating material in transverse relation to extend the terminal means inwardly and outwardly of the wall of the tubular housing.

References Cited by the Examiner
UNITED STATES PATENTS
2,774,894   12/1956   Antonidis et al. _____ 310—71

A. J. ROSSI, *Assistant Examiner.*

MILTON O. HIRSHFIELD, *Primary Examiner.*